United States Patent
Davies

(10) Patent No.: US 7,972,113 B1
(45) Date of Patent: Jul. 5, 2011

(54) INTEGRAL TURBINE BLADE AND PLATFORM

(75) Inventor: Daniel O. Davies, Palm City, FL (US)

(73) Assignee: Florida Turbine Technologies, Inc., Jupiter, FL (US)

( * ) Notice: Subject to any disclaimer, the term of this patent is extended or adjusted under 35 U.S.C. 154(b) by 644 days.

(21) Appl. No.: 11/799,642

(22) Filed: May 2, 2007

(51) Int. Cl.
*F01D 5/30* (2006.01)

(52) U.S. Cl. ............ 416/214 A; 416/219 R; 416/244 A; 416/248

(58) Field of Classification Search .......... 416/248, 416/219 R, 214 A, 244 A, 223 A, 239, 204 A, 416/217, 214 R, 220 R, 219 A
See application file for complete search history.

(56) References Cited

U.S. PATENT DOCUMENTS

| | | | | |
|---|---|---|---|---|
| 2,749,029 A | * | 6/1956 | Goetzel et al. | 416/241 R |
| 2,817,490 A | * | 12/1957 | Broffitt | 416/92 |
| 2,825,530 A | * | 3/1958 | Schum et al. | 416/92 |
| 3,132,841 A | | 5/1964 | Wilder, Jr. | |
| 3,713,752 A | | 1/1973 | Kurti | |
| 3,737,250 A | | 6/1973 | Pilpel et al. | |
| 3,749,518 A | | 7/1973 | Alver et al. | |
| 3,801,222 A | * | 4/1974 | Violette | 416/220 R |
| 3,846,041 A | * | 11/1974 | Albani | 416/97 R |
| 3,950,114 A | | 4/1976 | Helms | |
| 4,802,824 A | * | 2/1989 | Gastebois et al. | 416/193 A |
| 4,869,645 A | * | 9/1989 | Verpoort | 416/241 R |
| 4,921,405 A | * | 5/1990 | Wilson | 416/241 R |
| 5,318,406 A | * | 6/1994 | Bardes | 416/223 A |
| 5,405,244 A | * | 4/1995 | Boyd | 416/214 A |
| 5,984,639 A | * | 11/1999 | Gekht et al. | 416/220 R |
| 6,331,217 B1 | * | 12/2001 | Burke et al. | 148/522 |
| 7,284,958 B2 | * | 10/2007 | Dundas et al. | 416/193 A |

FOREIGN PATENT DOCUMENTS

| | | | |
|---|---|---|---|
| JP | 62157205 A | * | 7/1987 |
| JP | 2006097524 A | * | 4/2006 |

OTHER PUBLICATIONS

JPO Machine Translation JP 2006-97524. Accessed Dec. 8, 2010.*

* cited by examiner

*Primary Examiner* — Richard Edgar
(74) *Attorney, Agent, or Firm* — John Ryznic

(57) ABSTRACT

A turbine blade for a gas turbine engine, in which the turbine blade includes an airfoil portion with a root having a dovetail shape, and two platform halves that include a dovetail shaped opening within the platform halves to secure the blade root within the platform halves when fastened together. The platform halves have an outer fir tree shaped surface so that the blade assembly can be inserted into a slot within a rotor disk. the blade is uncoupled from the platform in the invention so that the airfoil can be made from a single crystal material with low casting defects because the platform is not cast with the airfoil. the two platform halves include the openings with side walls that are curved to follow the contour of the airfoil root so that the airfoil is secured within the platform halves against all directions of movement. An annular groove extends around the platform opening to provide for a seal to produce a seal between the high pressure cooling air supply passage within the platform and the lower pressure hot gas flow passing through the blade.

4 Claims, 4 Drawing Sheets

INTEGRAL TURBINE BLADE AND PLATFORM

CROSS-REFERENCE TO RELATED APPLICATIONS

This application is related to U.S. patent application Ser. No. 11/729,110 filed concurrently with this application and entitled TURBINE BLADE WITH SPAR AND SHELL CONSTRUCTION.

BACKGROUND OF THE INVENTION

1. Field of the Invention

The present invention relates generally to fluid reaction surfaces, and more specifically to a turbine blade with a separately formed platform.

2. Description of the Related Art including information disclosed under 37 CFR 1.97 and 1.98

In a gas turbine engine, such as an aero engine used to power an aircraft or an industrial gas turbine engine used to produce electrical power, a turbine section includes a plurality of stages of rotor blades and stator vanes to extract the energy from the hot gas flow passing through. The engine efficiency can be improved by increasing the temperature of the hot gas flow entering the turbine. However, the inlet temperature is limited to the material properties of the first stage vanes and rotor blades. To improve the efficiency, complex internal cooling circuits have also been proposed to provide impingement and film cooling to these airfoils in order to allow for a higher gas flow temperature.

Turbine blades made from a single crystal material are used in order to allow for improvements in the thermal mechanical failure (TMF), life cycle fatigue (LCF), and creep over single piece investment cast blades. Single crystal blades have a unique crystal structure that provides for higher creep resistance in the spanwise direction of the blade. However, single crystal blades that are formed with the blade platforms as a single piece have very high casting failure rates which lead to higher manufacturing costs. Also, the fillet between the airfoil portion and the platform of the blade acts as a stress concentration location. The higher resulting stress on the blade can result in shortened life.

U.S. Pat. No. 3,132,841 issued to Wilder, Jr. on May 12, 1964 and entitled COMPRESSOR BLADE AND MANUFACTURE THEREOF discloses a compressor blade made from a plastic fiber reinforced airfoil portion joined to a metallic base portion that forms the composite compressor blade. The airfoil portion includes a base with an insert that forms a dovetail shaped end opposite from the blade tip. The base is a single piece that has an outer contour of any suitable form for installation on a compressor rotor or stator body such as a conventional dovetail groove in a rotor. The internal opening of the base is shaped and dimensioned to conform to the outer contours of the blade foot and preferably the immediately adjacent part of the blade proper (see column 2, lines 28 through 42 of this patent). Apparently, the blade portion is passed through the opening in the base from the bottom end of the base. The turbine blade of the present invention has several significant structural differences to the Wilder patent that is described below.

Another prior art reference, U.S. Pat. No. 2,817,490 issued to Broffitt on Dec. 24, 1957 and entitled TURBINE BUCKET WITH INTERNAL FINS describes a turbine blade having an airfoil portion with a root portion formed of two parts, each part having an inner surface that is serrated transversely to the length of the blade and an outer surface that has dovetail grooves for insertion into a rotor disk slot. The root members are joined together by brazing or soldering to form a rigid integral turbine blade. The turbine blade of the present invention also has several significant structural differences to the Broffitt patent that is described below.

An object of the present invention is to de-couple the airfoil portion from the platform of the blade in order to reduce stress concentration.

Another object of the present invention is to produce a turbine blade made from a single crystal material in which the platform is formed from a separate piece in order to reduce casting defects.

Another object of the present invention is to provide for a single crystal turbine blade that can be secured within a standard dovetail slot of a rotor disk.

BRIEF SUMMARY OF THE INVENTION

The present invention is a composite turbine blade made from an airfoil portion secured to a two piece platform portion in order that the airfoil can be formed from a single crystal material without having to form the platform from the same single crystal in order to reduce defective castings. The airfoil portion includes a root with a dovetail shaped end which fits within a dovetail shaped slot formed between the two platform halves that are secured together by a fastener to secure the airfoil portion to the platform. The platform halves include a fir-tree configuration so that the turbine blade assembly can be inserted into a slot in the rotor disk. The present invention allows for a turbine blade to be made from a single crystal material with the platform decoupled from the airfoil. This allows for the blade to have an improved life over the prior art turbine blades, improved thermal mechanical fatigue, improved life cycle fatigue and improved creep resistance.

DETAILED DESCRIPTION OF THE INVENTION

Figure 1:
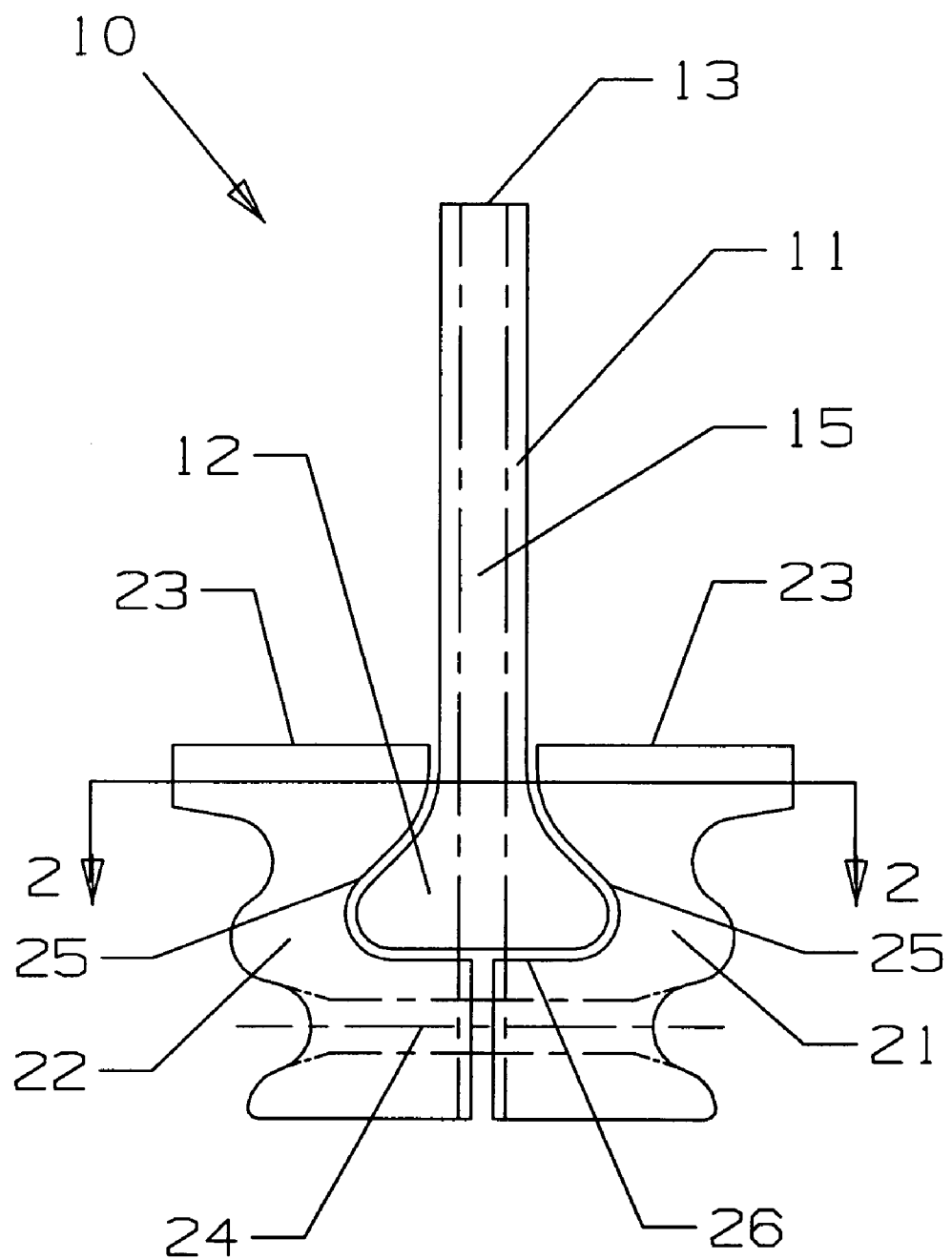
FIG. 1 shows a cross section view of the front of the turbine blade of the present invention.
Figure 2:
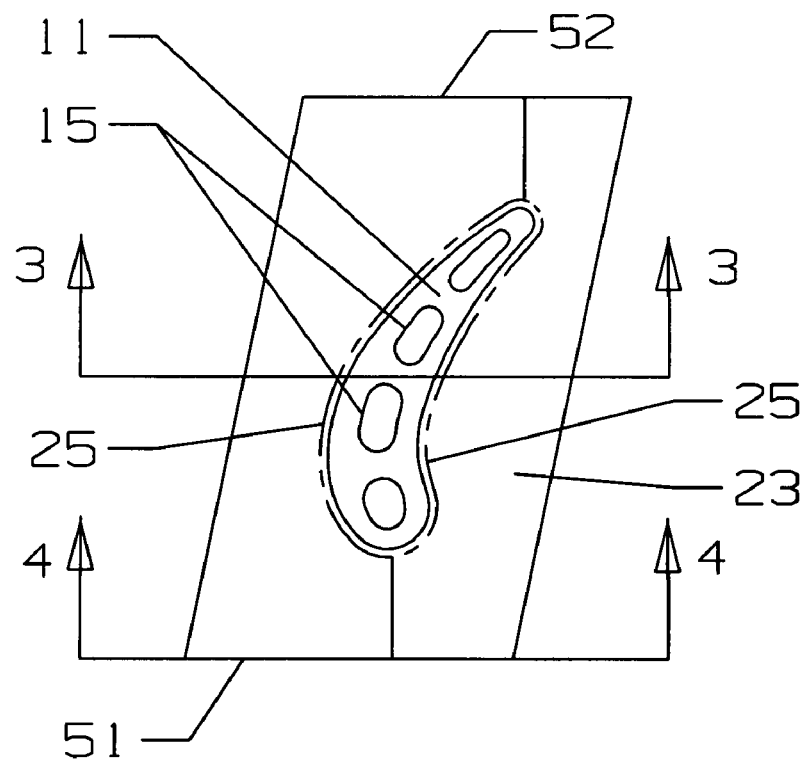
FIG. 2 shows a top view of the turbine blade of the present invention taken along the line shown in FIG. 1.
Figure 3:
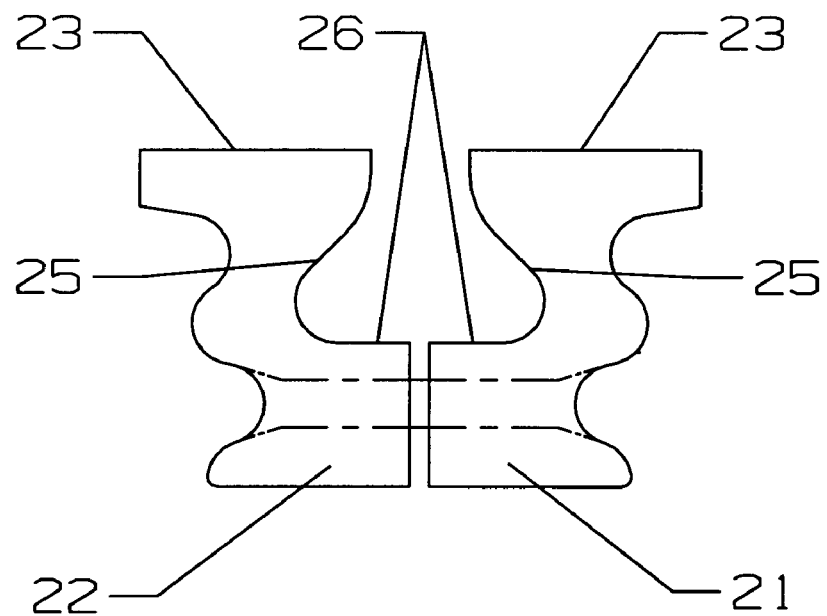
FIG. 3 shows a cross section view of the platform halves at the mid-point section taken along the line shown in FIG. 2.

The present invention is a turbine blade for use in a gas turbine engine, especially for an industrial gas turbine engine. The turbine blade includes a platform separate and uncoupled from the airfoil portion so that the airfoil can be made from a single crystal material with less casting defects than would the single piece turbine blade with the platform and airfoil formed as a single piece. FIG. 1 shows a front view of a cross section of the turbine blade of the present invention. The blade includes an airfoil portion 11 with a blade tip 13 and a dovetail 12 on the root end of the blade 11. The airfoil portion 11 as seen in FIG. 2 has a curvature typical of turbine blades in which the airfoil portion includes both curvature and twist extending from the platform to the blade tip. The airfoil 11 also can include one or more cooling air passages 15 to provide cooling air for the blade. The cooling air passages 15 can be radial passages or a series of serpentine flow passages. The airfoil root with the dovetail 12 is pinched between two platform halves 21 and 22 to form the blade assembly 10. Each of the platform halves 21 and 22 includes an opening 25 on the inner surface that forms the slot to receive the dovetail 12 of the airfoil 11 and a top or flow forming surface 23. As seen in FIG. 2, the openings 25 in the platform halves 21 and 22 extend around the airfoil 11 on both the leading edge trailing edges and both the pressure and suction sides. The dovetail 12 in the airfoil 11 also has the shape of the dashed lines in FIG. 2 that represent the slots 25 formed within the platform halves 21 and 22. The dovetail 12 and slots 25 are shaped and sized so that the dovetail 12 will fit tightly within the slots 25 between the platform halves 21 and 22 when the platform halves are fastened together. Each platform halve 21 and 22 includes at least one hole 24 as seen in FIGS. 1 and 3 to receive a fastener such as a threaded bolt and a top or flow forming surface 23. If a threaded bolt is used to secure the platform halves together, then at least the hole 24 opposite to the bolt head would include threads as well.

Figure 4:
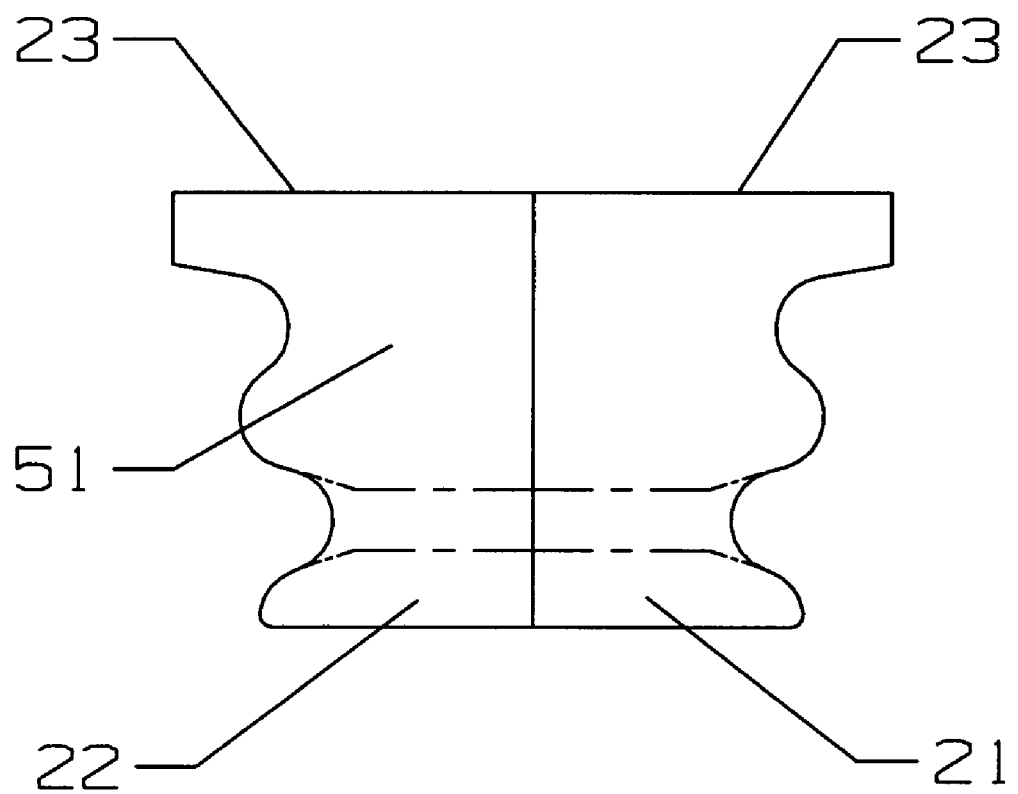
FIG. 4 shows a front view of the platform halves taken along the line shown in FIG. 2.

FIGS. 2, 3 and 4 show further details of the platform halves 21 and 22 in which the opening that forms the slot does not extend from the leading edge side 51 to the trailing edge side 52 of the platforms. FIG. 3 shows a cut through the platform halves through the middle of the platform as seen in FIG. 2. In FIG. 3, the slot is formed by a side surface 25 and a bottom surface 26 on each of the platform halves 21 and 22 which does not open onto the bottom surface of the platform assembly (the two platform halves) like in the Wilder patent (in the Wilder patent, the opening in the base for the airfoil is required to open onto the bottom surface of the base so that the airfoil can slide through the opening). The opening 25 and 26 extends just over the length of the airfoil from upstream from the leading edge to downstream from the trailing edge as seen in FIG. 2. FIG. 4 shows a view of the platform halves taken along the line shown in FIG. 2 along the leading edge side 51 of the platform. Thus, the opening within the platform halves that receive the dovetail of the airfoil root 12 is formed by the sides 25 of each platform halves, the bottoms 26 of the platform halves, and the front and rear sides of the opening. The opening formed between the two platform halves is shaped and sized to prevent movement of the airfoil in all three degrees of motion and twist about the axis. The two platform halves, as seen from FIG. 2, join along lines on the front side that extend from the leading edge of the airfoil and along lines on the rear side that extend from the trailing edge. In this particular embodiment seen in FIG. 2, the two joining lines are parallel but offset from each other (not axially aligned). This is due to the curvature of the airfoil at the platform of the blade. This is also required for insertion of the airfoil and root into the opening that forms the slot in the two platform halves.

On the leading edge (front) side and the trailing edge (rear) side, the platform is solid from between the fir tree slots. The main reason why the slots 25 formed within the platform halves do not extend through the platform halves (as seen in FIG. 2) is so that the platform halves will have material to reduce the stress levels when the airfoil root 12 is making contact with the dovetail slot 25 formed within the platform halves as a result of the centrifugal force acting to pull the airfoil out form the platform. Without the extra mass of material on the front and rear ends of the platform halves, the force acting from the airfoil slot 12 onto the slanted surface of the slot 25 (as seen in FIG. 1) will tend to pull the bottom portions of the platform halves apart.

With the present invention, a solid crystal airfoil and root portion can be cast without the problems of casting defects that would result from casting the platforms integral with the airfoil to form the turbine blade. The airfoil and root can be cast having the curvature and twist that the design requires. The airfoil and root can also be cast with the internal cooling air passages. The airfoil will include the dovetail shaped root 12 that also will have the airfoil curvature in order that the single crystal cast airfoil and root will extend generally along a straight line so that the casting success is increased over the prior art casting process. The single crystal airfoil and root piece is then positioned within the slots 25 formed on the platform halves 21 and 22, and a fastener is used to tighten the platform halves together such that the airfoil root 12 is tightly secured between the platform halves. Thus, a turbine blade is formed having a airfoil portion made from a single crystal material for improved performance over nickel based super-alloy turbine blades and for less casting defects from casting the platforms and the airfoils as a single piece blade from single crystal material.

The advantage of the present invention composite turbine blade over the Wilder blade is that the composite blade of the present invention is not permanently bonded together so that the airfoil can be replaced within the platform halves and easily reinstalled within the rotor disk of the turbine. In the Wilder patent, the laminated plastic airfoil is secured within the base or adapter that is bonded together. Also, in the present invention the slot formed within the platform halves has the curvature of the airfoil and extends within the platform between the front and rear surfaces without opening onto these two surfaces. The slot 25 also includes a bottom formed within the platform halves so that the slot 25 does not open onto the bottom surface of the platform halves as is the case in the Wilder patent. Instead of inserting the airfoil through an opening on the bottom of the platform halves (as in the Wilder patent), the platform halves 21 and 22 are placed onto the sides of the airfoil root 12 and into position before the fastener is tightened to secure the platform halves together with the airfoil root tightly fitted between the platform halves. This structure is not shown in the Wilder patent and allows for the composite turbine blade to operate under higher stress producing situations while providing for a rigid platform assembly that will secure the airfoil within the platform halves. This is especially an important desire for a composite turbine blade that is used in an industrial gas turbine engine because the blades are up to 36 inches from tip to platform. This large and massive turbine blade will produce very high levels of stress around the contact faces formed between the root dovetail 12 and the platform slot 25.

Figure 5:
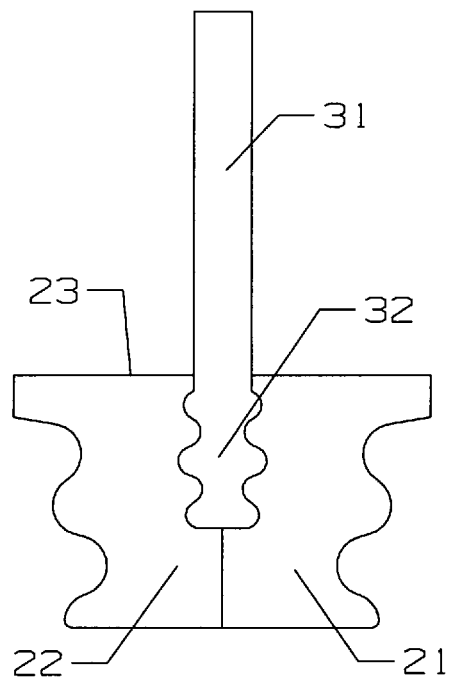
FIG. 5 shows a cross section view of the front of a second embodiment of the present invention.

FIG. 5 shows a second embodiment of the present invention in which the root 32 extending from the airfoil 31 includes a fir-tree configuration that fits within a fir-tree shaped slot formed between the platform halves 21 and 22, where the platform halves include a fir-tree configuration on the outside in order to secure the blade within the slot of a rotor disk.

Figure 6:
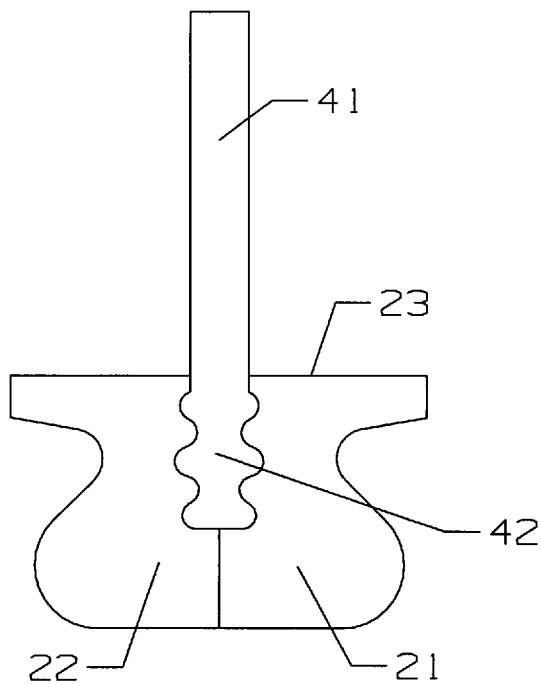
FIG. 6 shows a cross section view of the front of a third embodiment of the present invention.

FIG. 6 shows a third embodiment of the present invention in which the root 42 extending from the airfoil 41 includes a fir-tree configuration to fit within a fir-tree shaped slot formed between the two platform halves, and where the platform halves include a dovetail shaped slot on the outer surface that is sized to slide within a similar shaped dovetail slot formed within the rotor disk. In both of the second and third embodiments of FIGS. 5 and 6, the openings in the platform halves that form the slot do not extend from the front face to the rear face of the platform halves as in the first embodiment.

Figure 7:
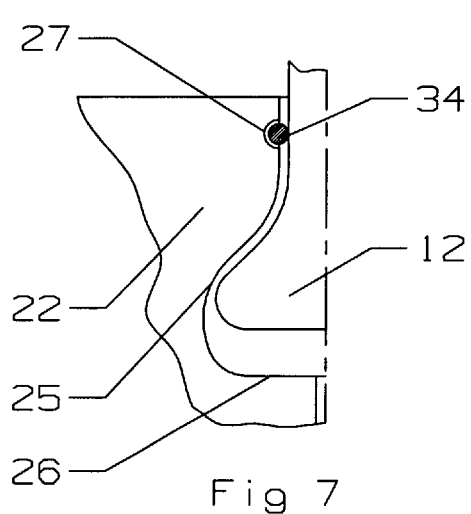
FIG. 7 shows a detailed view of a seal arrangement between the airfoil and the platforms for all embodiments of the present invention.
Figure 8:
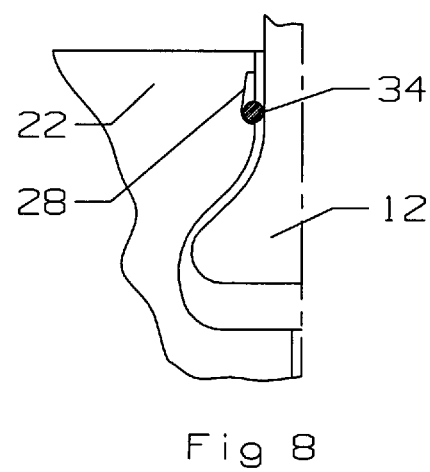
FIG. 8 shows a detailed view of second embodiment for the seal arrangement between the airfoil and the platforms for all embodiments of the present invention.

FIG. 7 shows a seal 34 and groove 27 arrangement used to provide for a seal between the airfoil root and the platform halves when the blade is assembled. In FIG. 7, the seal and the groove 27 extend around the airfoil root from leading edge to trailing edge and from pressure side to suction side. In the FIG. 8 embodiment of the blade seal and groove assembly, the groove 28 is narrower at the top end to produce a compression within the seal 34 as the seal is forced upward form centrifugal force when the turbine blade is rotating within the rotor disk. This embodiment provides for a loser forming fit of the seal within the groove during blade assembly, and a tighter fit when the turbine blade is in operation. The seal 34 in both embodiments can be any material that is capable of withstanding the high temperatures in which the turbine blade operates. The seal 34 can have a C-shaped cross section with the open end facing toward the higher pressure side which is away from platform top or flow forming surface 23, or the seal can have an E-shaped cross section with the open end facing toward the higher pressure side so that the pressure difference will expand the seal and provide better sealing between the airfoil root 12 and the platform slot 25. The seal 34 can also be a wire rope seal or a hybrid ceramic material seal having a Nextel fiber inner portion and a metallic outer covering of the fibers.

I claim the following:

1. A turbine rotor blade for use in a gas turbine engine, the turbine rotor blade comprising:
    an airfoil with a root section formed as a single piece;
    the root section is formed as a dovetail slot or a fir tree configuration;
    a first platform half and a second platform half;
    each of the two platform halves include a slot having at least a side and a bottom and being sized and shaped to complementarily fit the root section to prevent movement of the airfoil in all three degrees of motion and twist about an axis when the platform halves are placed around the root section;
    the two platform halves are not bonded to the root section so that the airfoil is thermally uncoupled from the two platform halves and the airfoil can be removed from the platform halves when the blade is removed from a slot in a turbine rotor disk by pulling the platform halves away from the root section; and,
    the airfoil is secured within the two platform halves when the platform is inserted into the slot of the turbine rotor disk.

2. The turbine rotor blade of claim 1, and further comprising:
    the airfoil and the root section have a curvature; and,
    the slots in the two platform halves have a curvature of the same shape as the root section curvature.

3. The turbine rotor blade of claim 1, and further comprising:
    the two platform halves have a hole for insertion of a bolt to secure the airfoil and root section within the two platform halves.

4. The turbine rotor blade of claim 1, and further comprising:
    the platform halves include adjoining surfaces at the airfoil leading edge on the front of the platform and at the airfoil trailing edge on the rear of the platform.

* * * * *